(12) United States Patent
McDonald Floyd et al.

(10) Patent No.: US 10,690,359 B2
(45) Date of Patent: Jun. 23, 2020

(54) PORTABLE PERSONAL AIR-TREATMENT SYSTEM

(71) Applicants: Bonnie Iris McDonald Floyd, Baton Rouge, LA (US); Ronald J. Monroe, Sr., Milan, GA (US)

(72) Inventors: Bonnie Iris McDonald Floyd, Baton Rouge, LA (US); Ronald J. Monroe, Sr., Milan, GA (US)

( * ) Notice: Subject to any disclaimer, the term of this patent is extended or adjusted under 35 U.S.C. 154(b) by 1 day.

(21) Appl. No.: 15/801,326

(22) Filed: Nov. 2, 2017

(65) Prior Publication Data

US 2019/0093909 A1  Mar. 28, 2019

Related U.S. Application Data

(60) Provisional application No. 62/563,040, filed on Sep. 25, 2017.

(51) Int. Cl.
*F24F 5/00* (2006.01)
*F25D 3/08* (2006.01)
(Continued)

(52) U.S. Cl.
CPC ............ *F24F 5/0017* (2013.01); *A45C 11/20* (2013.01); *F24F 1/04* (2013.01); *F24F 5/0021* (2013.01);
(Continued)

(58) Field of Classification Search
CPC .. F24F 5/0017; F24F 1/04; F24F 1/025; F24F 5/0021; F25D 3/08; F25D 2303/0821;
(Continued)

(56) References Cited

U.S. PATENT DOCUMENTS 222,122 A     12/1879  Bate
1,969,643 A   12/1932  Fuchs et al.
(Continued)

FOREIGN PATENT DOCUMENTS

KR     20010068496 A  *  7/2001

*Primary Examiner* — Frantz F Jules
*Assistant Examiner* — Martha Tadesse
(74) *Attorney, Agent, or Firm* — Michael Drew

(57) ABSTRACT

An air-treatment system comprises an air-intake chamber in fluid-flow communication with an air-treatment chamber and an air-exhaust chamber in fluid-flow communication with said air-treatment chamber. The air-intake chamber has an air-intake port placing said air-intake chamber in fluid-flow communication with an environment exteriorly of said air-intake chamber, said air-treatment chamber, and said air-exhaust chamber. The air-exhaust chamber has an exhaust-air port placing said air-exhaust chamber in fluid-flow communication with the environment exteriorly of said air-intake chamber, said air-treatment chamber, and said air-exhaust chamber. A canister assembly removably disposed within said air-intake chamber comprises a plurality of heat-conductable canisters each adapted for containing a heat-exchange substance. The canisters are disposed in spaced-apart arrangement permitting air flow between and around the canisters. A fan is disposed for drawing in air through said air-intake port, circulating said air between and around said canisters and exhausting said air through said exhaust-air port.

11 Claims, 7 Drawing Sheets

(51) Int. Cl.
*F24F 1/04* (2011.01)
*A45C 11/20* (2006.01)

(52) U.S. Cl.
CPC ........ *F25D 3/08* (2013.01); *F25D 2303/0821* (2013.01); *F25D 2303/08221* (2013.01); *F25D 2303/08222* (2013.01); *F25D 2331/804* (2013.01)

(58) Field of Classification Search
CPC . F25D 2303/08221; F25D 2303/08222; F25D 2331/804; Y02E 60/147; F28D 20/021
See application file for complete search history.

(56) References Cited

U.S. PATENT DOCUMENTS

| | | | |
|---|---|---|---|
| 2,093,853 A | 9/1937 | Snavely | |
| 2,129,255 A | 9/1938 | Andros | |
| 2,682,987 A | 7/1954 | Spiess, Jr. | |
| 2,841,964 A * | 7/1958 | Anderson | F24F 5/0017 62/426 |
| 2,959,032 A | 11/1960 | Davis | |
| 3,164,971 A | 1/1965 | Gentz | |
| 3,538,925 A * | 11/1970 | Reiner | A45D 4/16 132/233 |
| 4,468,932 A | 9/1984 | Bullard | |
| 4,841,742 A | 6/1989 | Biby | |
| 5,046,329 A | 9/1991 | Travis, III | |
| 5,159,819 A | 11/1992 | Wong | |
| 5,201,194 A | 4/1993 | Flynn, Jr. et al. | |
| 5,423,996 A * | 6/1995 | Salyer | A61F 7/03 165/104.12 |
| 5,626,022 A * | 5/1997 | Scudder | A47J 36/28 62/4 |
| 5,636,524 A | 6/1997 | Woods et al. | |
| 5,737,938 A | 4/1998 | Liu | |
| 6,170,282 B1 | 1/2001 | Eddins | |
| 6,345,802 B2 * | 2/2002 | Moore | F25C 1/22 249/117 |
| 6,401,483 B1 | 6/2002 | Kopp | |
| 6,568,202 B1 | 5/2003 | Hodges | |
| 6,843,062 B2 | 1/2005 | Crete | |
| 6,886,360 B1 | 5/2005 | Rosenbaum et al. | |
| 2003/0230109 A1* | 12/2003 | Link | B60H 1/00264 62/420 |
| 2006/0225453 A1 | 10/2006 | Martello | |
| 2006/0248917 A1* | 11/2006 | Urfig | F24F 5/0017 62/420 |
| 2006/0254305 A1* | 11/2006 | Urfig | F24F 5/0017 62/425 |
| 2007/0000277 A1 | 1/2007 | Bracher | |
| 2008/0271468 A1* | 11/2008 | Monroe | F24F 1/04 62/89 |

* cited by examiner

PORTABLE PERSONAL AIR-TREATMENT SYSTEM

RELATED APPLICATIONS

This application claims priority to U.S. Provisional Application No. 62/563,040 filed Sep. 25, 2017, the entirety of which is incorporated herein by reference.

TECHNICAL FIELD

This invention relates to air conditioners and heaters, and more particularly, the invention relates to a compact, easily-movable air-treatment unit that is capable of alternately serving as an air conditioner or a heater for an individual.

BACKGROUND OF THE INVENTION

An important factor in the comfort of individuals is the temperature of the air in the immediate environment. When the temperature of air in the environment is elevated such as in summer, an individual may desire that the air be cooled to a lower temperature. When the temperature of the air in the environment is low, such as in winter, an individual may desire that the air be heated to a higher temperature.

Individuals are often in environments wherein although they may desire to change the temperature of the air it is not feasible or possible to alter air temperature because the entire surrounding environment is too large. Thus it can be appreciated that it would be useful to have a means for altering the temperature of ambient air in an environment immediately adjacent an individual.

SUMMARY OF THE INVENTION

An air-treatment system in accordance with the invention comprises an air-intake chamber in fluid-flow communication with an air-treatment chamber and an air-exhaust chamber in fluid-flow communication with the air-treatment chamber. The air-intake chamber has an air-intake port placing the air-intake chamber in fluid-flow communication with an environment exteriorly of the air-intake chamber, the air-treatment chamber, and the air-exhaust chamber. The air-exhaust chamber has an exhaust-air port placing the air-exhaust chamber in fluid-flow communication with the environment exteriorly of the air-intake chamber, the air-treatment chamber, and the air-exhaust chamber. A canister assembly removably disposed within the air-intake chamber comprises a plurality of heat-conductable canisters each adapted for containing a heat-exchange substance. The canisters are disposed in spaced-apart arrangement permitting air flow between and around the canisters. A fan is disposed for drawing in air through the air-intake port, circulating the air between and around the canisters and exhausting the air through the exhaust-air port.

The system provides a compact, portable, mechanism with a modular heat-exchange core for raising or lowering the temperature of air in an environment immediately adjacent the system for the comfort of the individual user.

DETAILED DESCRIPTION

Figure 1:
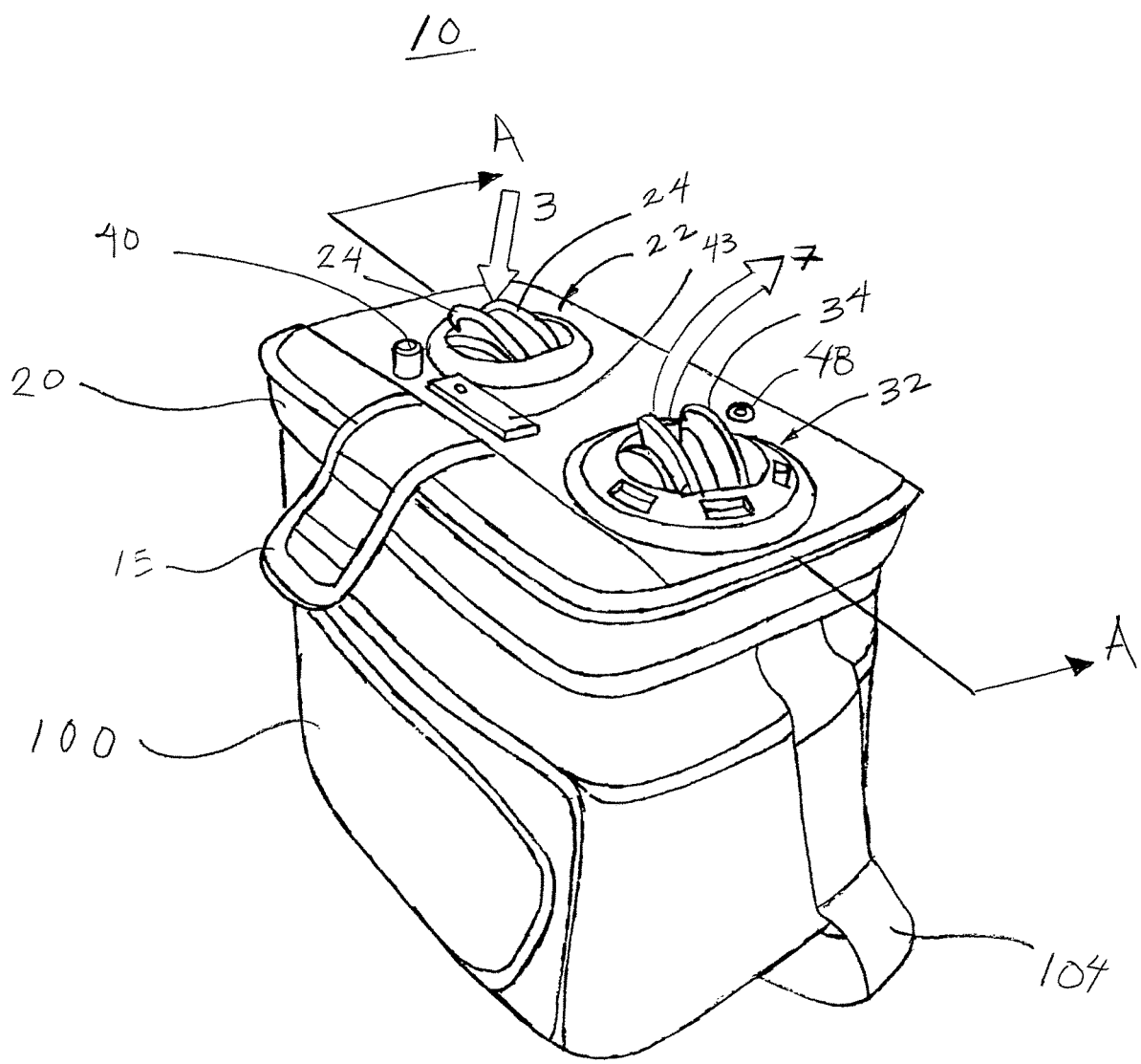
FIG. 1 is a perspective illustration of an apparatus unit of a portable personal air-treatment system embodying the teachings of the invention.

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Referring now to the drawings, wherein like numerals indicate like elements throughout the several views, the drawings illustrate certain of the various aspects of exemplary embodiments.

As an overview, the invention provides a personal portable air-treatment system incorporating the teachings of the invention that can function alternately as a compact, portable air conditioner or heater for an individual. The system comprises an apparatus, heat-exchange substances, and methodology for elevating or lowering air temperature for direct, personal cooling or warming of an individual in an open environment or in a very small enclosed environment. An apparatus incorporating teachings of the invention sometimes for convenience herein is referred to as the "unit." Reference is made briefly to the drawings as a whole for purposes of this overview. The unit 10 serves as a portable personal air conditioner when a low-temperature (frozen or cold) heat-exchange substance such as, but not limited to, ice contained within the canisters 140 of the canister assembly 120 is loaded within the air-treatment chamber 101 defined by the lower housing 100. The unit 10 serves as a heater when a high-temperature heat-exchange substance such as, but not limited to, melted wax, hot water or hot oil is loaded within the lower housing 100. Ambient air 3 proximate the unit 10 is brought through an air-intake chamber 41, directed through an air-treatment chamber 101 where the air is either cooled or heated and directed through an air-exhaust chamber 51 outwardly of the unit as cooled or heated treated air 7. The unit 10 comprises a housing having an upper portion 20 and a lower portion 100. Air 3 is brought in through an air-intake port 22 in the upper housing 20 portion and cooled air or heated air is blown out of an exhaust-air port 32 of the upper housing portion. Ambient air 3 brought in through the air-intake port 22 is passed through the lower housing 100 over and through a canister assembly 120 comprising a plurality of individual closed canisters 140. Through heat exchange, frozen phase changeable material in the sealed canisters removes heat from the flowing air thereby cooling the air as it passes through the air-treatment chamber 101 defined by the lower housing. Air 5 treated in the air-treatment chamber is directed from the air-treatment chamber 101 into the air-exhaust chamber 51 defined in the upper housing 20 to the exhaust-air port 32 of the upper housing. Alternately, in the same embodiment through heat exchange, a heated material adds heat to the flowing air thereby warming the air as it passes through the air-treatment chamber 101 of the lower housing 100.

References herein to the top of the unit are sometimes used to refer to that portion of the unit comprising and formed of the upper housing 20 as taught by the invention.

For convenience of explanation, the invention will first be described in the context of being a portable personal air conditioner. However, the elements of the invention are equally applicable when the unit 10 is used in its alternate capacity as a portable personal heater. The only difference being the substance that is contained in the canisters 140.

Referring first particularly to FIG. 1, therein is shown a perspective illustration of a portable personal air conditioner unit 10 in accordance with the teachings of the present invention. The unit 10 comprises an upper housing 20 defining an upper compartment and a lower housing 100 defining a lower compartment. The upper housing 20 is pivotable between a closed condition and an open condition with respect to the lower housing 100 by means of a hinge structure (not shown). When engaged, a fastener 15 keeps the upper housing 20 and lower housing 100 clasped together with one another in a closed condition. Ambient air 3 from the environment is urged into the unit 10 through an air air-intake port 22 that is fitted with adjustable air-intake louvers 24. Cooled air 7 exits the unit 10 through an exhaust-air port 32 that is fitted with adjustable outlet louvers 34. A control knob 40 of an on-off switch and fan speed controller is disposed on the outer cover of the upper housing 20. A battery charge indicator 46 is disposed in the top outer surface of the upper housing 20 for convenience. An insert port 48 for an electrical adapter or charger is also disposed in the outer surface of the upper housing 20. A carrying strap 104 is attached to the unit 10 to help facilitate transport of the unit by a user.

Figure 2:
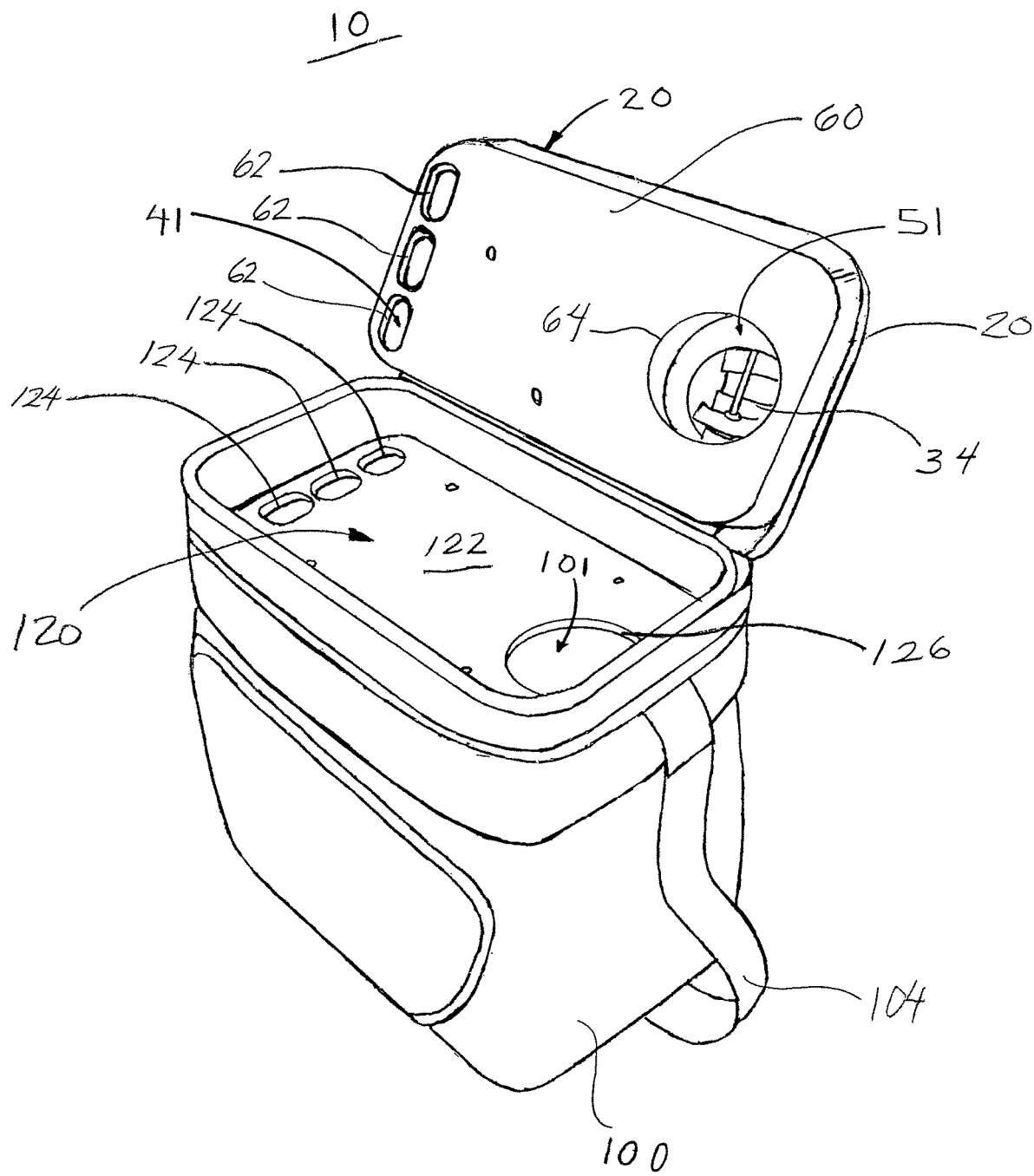
FIG. 2 is a perspective illustration of the portable personal air-treatment unit of FIG. 1 shown with the upper portion of the air-treatment unit in an open condition.

Referring now to FIG. 2, therein is shown the unit 10 of FIG. 1 in an open condition with the upper housing 20 pivoted away from the lower housing 100. An additional feature of the invention that can be seen in this view is the upper housing cover 60 that is removably affixed to the upper housing. The cover 60 defines cover inlet apertures 62 through which air passes from the upper housing 20 into the lower housing 100 to the air-treatment chamber 101. The upper housing cover 60 also defines a cover outlet aperture 64 through which cooled air enters the upper housing 20 from the lower housing 100. Another feature shown in FIG. 2 is the canister assembly 120. In FIG. 2, the canister assembly 120 is shown in what is referred to herein as an "inverted" condition as a point of reference. This point of reference is used because in the embodiment illustrated, canisters 140 of the canister assembly 120 are in the general form of soft-drink bottles for purposes of illustration and discussion. As such, the typical resting orientation for the canister 140 is with the tapered opening portion pointing upward while resting on the lower more uniform end. What is referred to as the tray 122 of the canister assembly 120 is positioned adjacent the lower ends of the canisters 140. The tray 122 of the canister assembly 120 is disposed at the top portion of the lower housing 100. The tray 122 of the canister assembly 120 defines canister tray inlet apertures 124 through which air to be cooled (treated) enters the air-treatment chamber 101 defined by the lower housing 100. The canister tray 122 inlet apertures 124 are disposed for alignment with the upper housing cover inlet apertures 62. The tray 122 of the canister assembly 120 also defines a tray outlet aperture 126 through which cooled air flows from the air-treatment chamber 101 of the lower housing 100 into the air-exhaust chamber 51 of the upper housing 20. The tray outlet aperture 126 is disposed for alignment with the upper housing cover outlet aperture 64.

Figure 3:
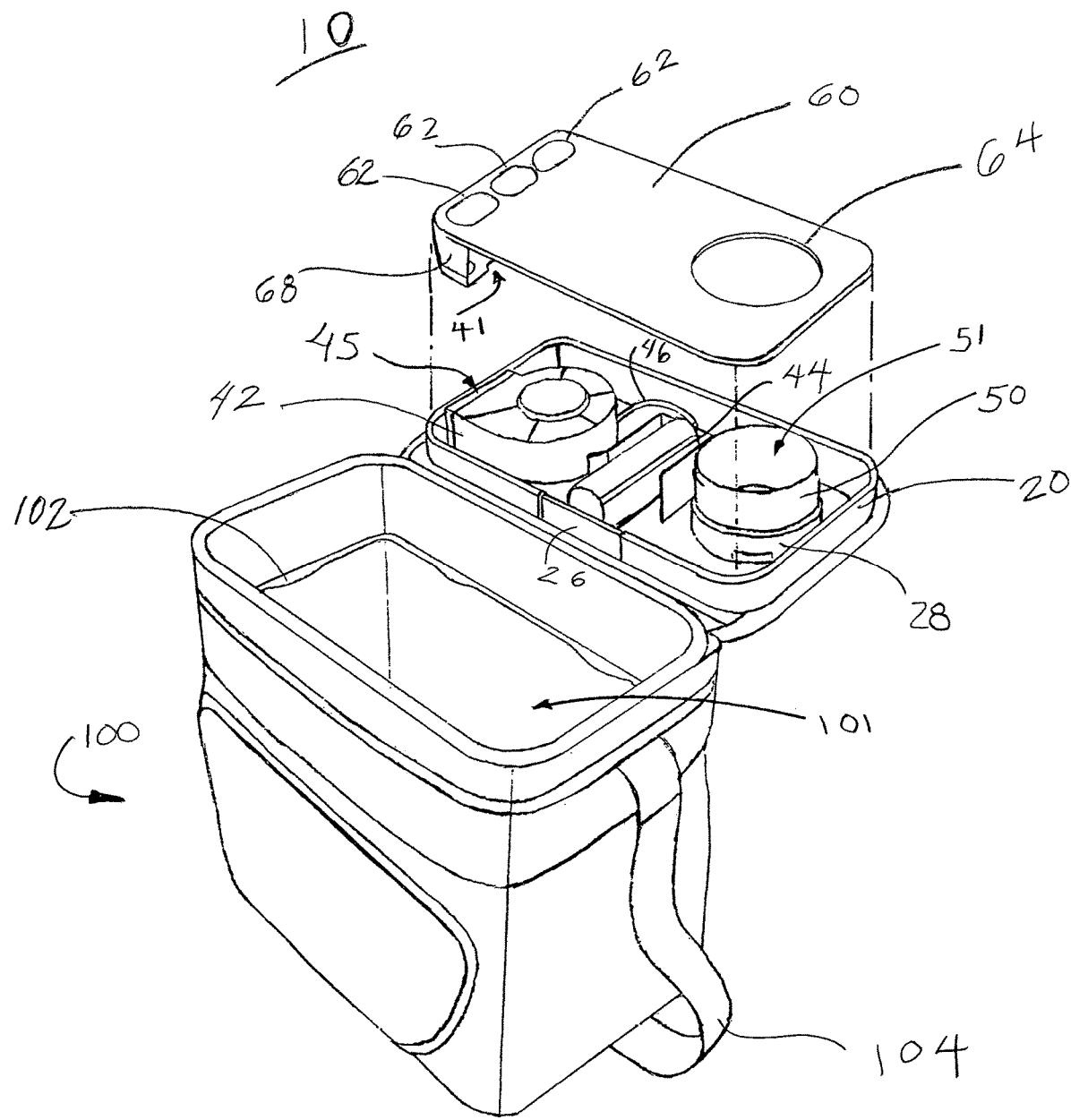
FIG. 3 is a perspective illustration of the portable personal air-treatment unit of FIG. 1 with the upper portion in open condition with the upper housing cover separated from the upper housing revealing features contained in the upper housing.

Referring now to FIG. 3, the unit 10 is again shown in open condition with the upper housing 20 pivoted away from the lower housing 100. In this view the cover 60 of the upper housing 20 is shown separated and spaced apart from the upper housing 20 to reveal additional features of the invention. In use, separation of the upper housing 20 from the lower housing 100 permits access to the interior of the lower housing 100 as well as some elements of the interior of the upper housing 20. A plenum wall structure 68 for helping direct intake ambient air 3 through the cover inlet apertures 62 extends from the upper housing cover 60. A fan 42 is disposed for urging ambient air 3 into the upper housing 20 from the exterior of the unit 10 and through the upper housing cover inlet apertures 62 into the lower housing 100. A battery pack 44 is connected by wiring 46 to the fan 42 and other electrical components not visible in this view. A battery access panel 26 is disposed within the upright perimeter portion of the upper housing 20 so that it is either fully or partially removable to permit access to the battery pack 44. Within the interior of the lower housing 100, an assembly abutment 102, in the nature of a lip, extends outwardly of the inner wall of the lower housing 100 for receiving the tray 122 of the canister assembly 120. A conduit 50 fitted with a sleeve 28 serves as an air-exhaust chamber 51 and directs cooled air from the lower housing 100 through the upper housing cover aperture 64 to the exhaust-air port (not shown in this view).

Figure 4:
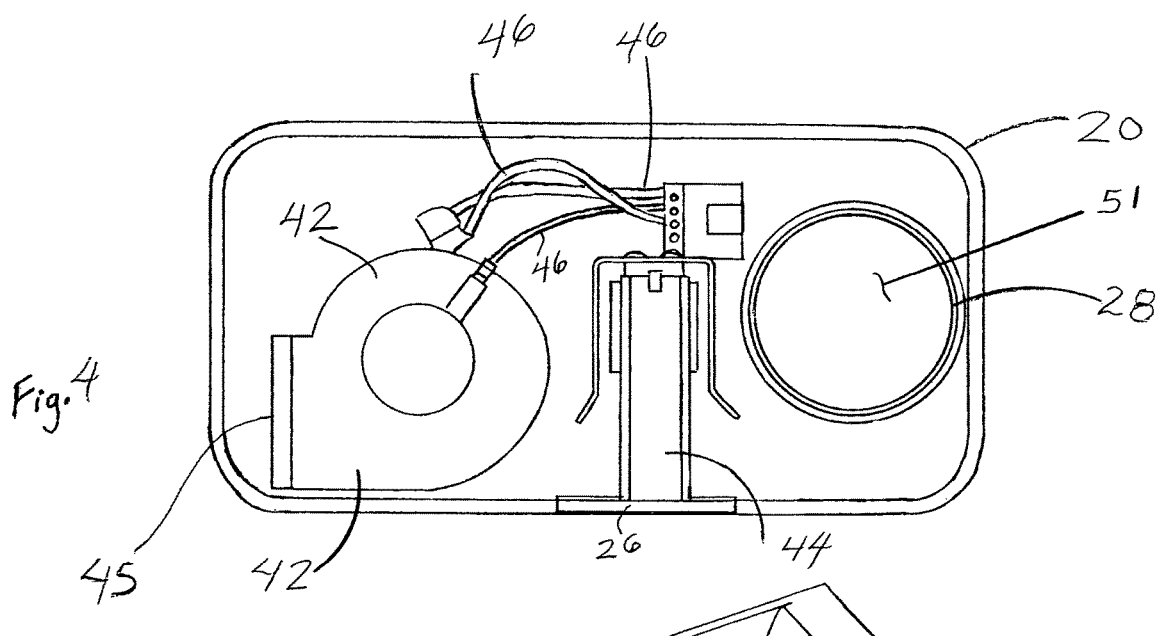
FIG. 4 is a plan illustration of the underside of the upper housing of the portable personal air-treatment unit of FIG. 1 with the upper housing cover removed.

Referring now to FIG. 4, from the plan view of the underside of the upper housing therein is shown the fan 42 for circulating air through the unit 10, the battery pack 44, and wiring 46 connecting various electrical components such as the fan 42 and battery pack 44. The disposition and orientation of the exhaust opening structure 45 of the fan 42 are shown. The intake opening of the fan 42 is on the opposite side of the fan and not visible in this view. The battery access door 26 in the upper housing can be seen in this view. The sleeve 28 for receiving the conduit 50 for directing cooled air to the exhaust-air port 32 is shown in this view.

Figure 5:
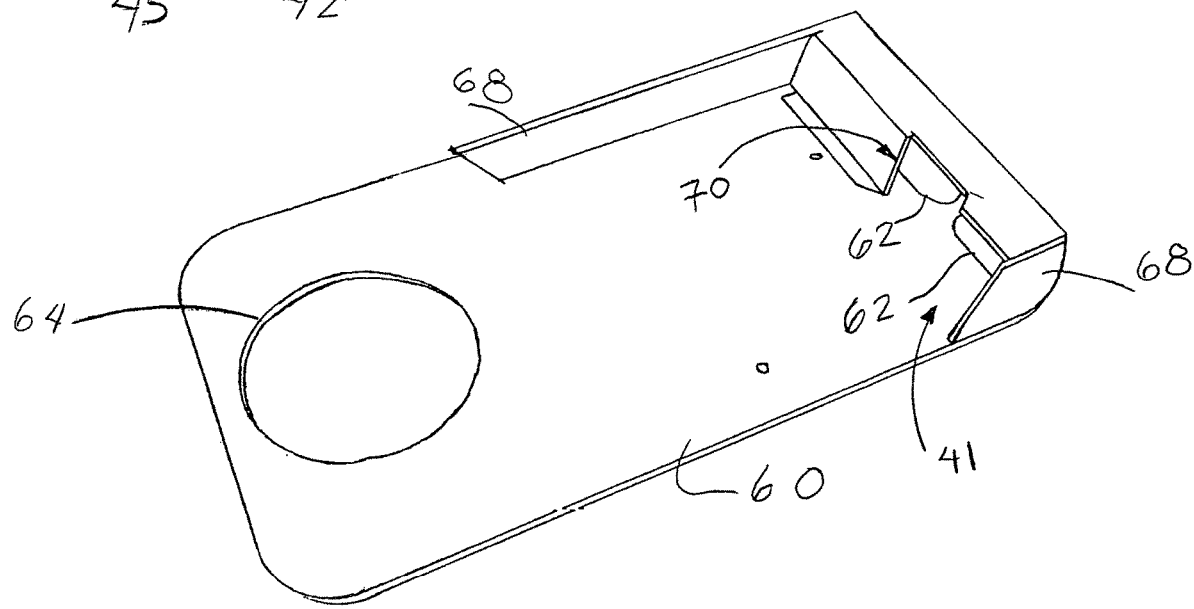
FIG. 5 is a perspective illustration of the underside of the upper housing cover.

Referring now to FIG. 5, the underside of the upper housing cover 60 is shown in this perspective view. The plenum wall structure 68 extends from the cover 60 to form a plenum, an essential portion of the air-intake chamber 41. Several cover apertures 62 are also shown in this view within the plenum defined by the plenum wall structure 68.

The plenum wall structure 68 also defines a slot-like plenum opening 70 in the plenum that is formed. The plenum opening 70 is disposed for alignment with the exhaust opening structure 45 of the fan 42 (42 & 45 are shown in FIG. 4) further forming the air-intake chamber 41. Intake ambient air 3 that is exhausted from the exhaust opening structure 45 of the fan 42 is blown into the plenum and, in turn, outwardly of the plenum through the upper housing cover inlet apertures 62.

Figure 6:
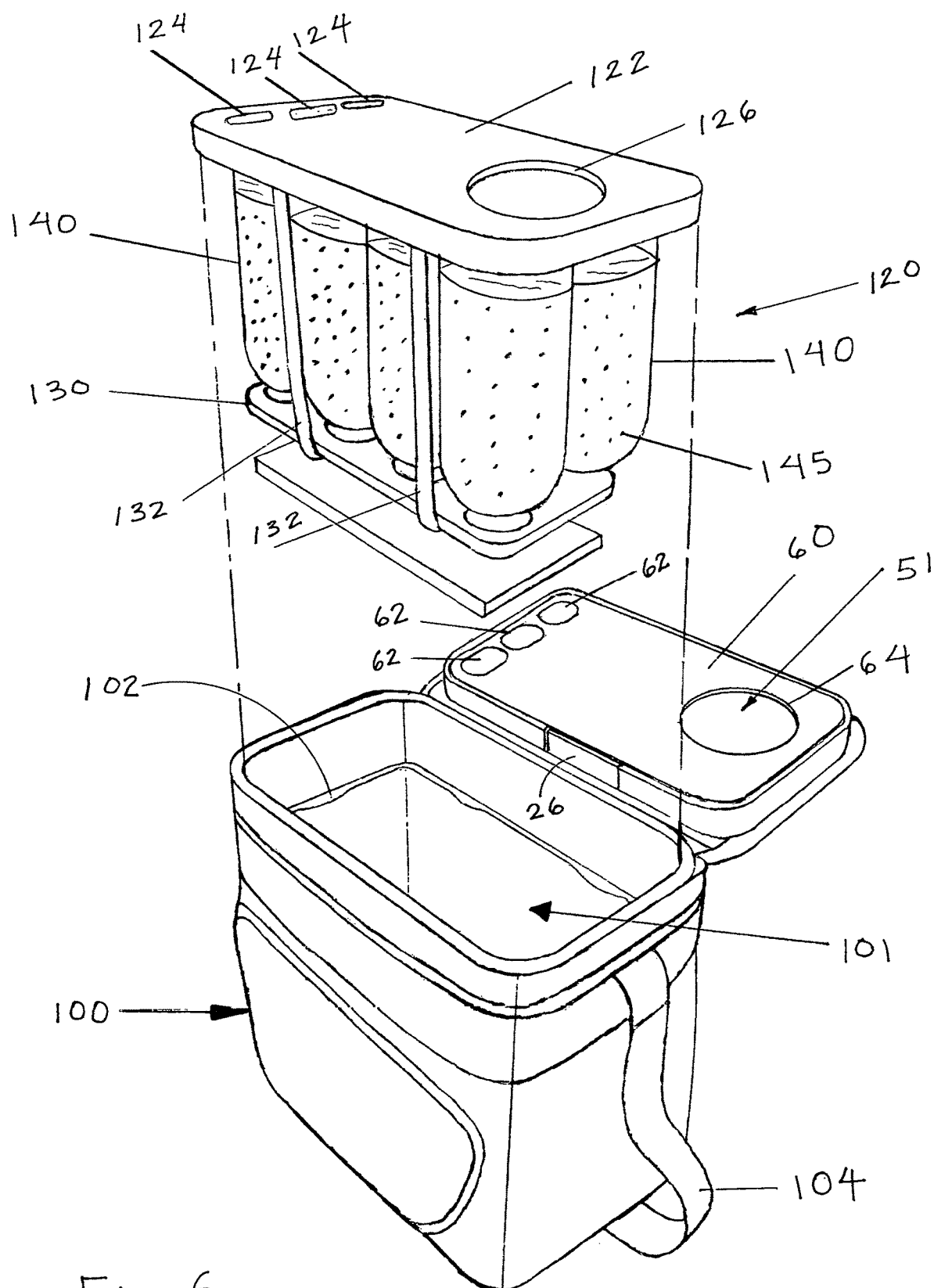
FIG. 6 is a perspective illustration of the portable personal air-treatment unit of FIG. 1 with the top of the air-treatment unit, as defined by the upper housing, in open condition and with the canister assembly separated from the lower housing.

Referring now to FIG. 6, therein is shown the unit 10 in open condition with the canister assembly 120 removed but in alignment for placement in the lower housing 100. The canister assembly 120 retains a plurality of sealed canisters 140. The assembly 120 includes a tray 122 and a top retention plate 130 between which are retained canisters 140. Assembly retainers 132 interconnect the tray 122 and retention plate 130 to hold the canisters 140 in place. The retention plate 130 and tray 122 are secured to one another by the assembly retainers 132, sandwiching the canisters in between the tray 122 and retention plate 130. Assembly retainers can be any conventional means of securing two plates to one another. For example, the invention contemplates use of elastic bands wrapped around the tray 122 and retention plate 130 as a means of securing the canisters 140 between the two structures 122, 130. The inverted assembly is received by the lower housing 100 and is supported by the tray's 122 engagement of the abutment 102 formed on the interior wall of the lower housing 100.

Figure 7:
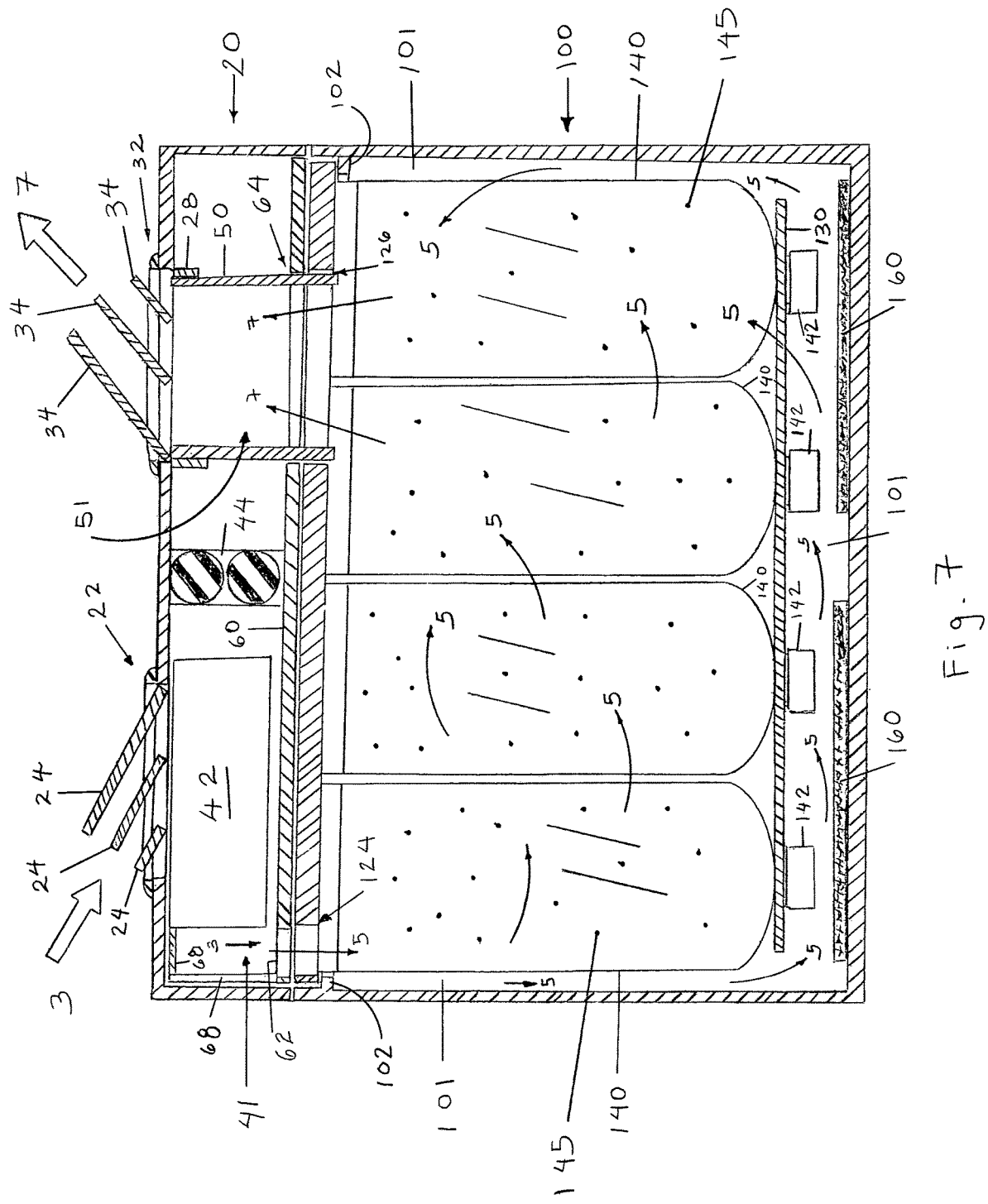
FIG. 7 is a sectional illustration of the portable personal air-treatment unit of FIG. 1 taken along line A-A of FIG. 1.

Referring now to the sectional view of FIG. 7 taken along line A-A of FIG. 1, therein is shown the interior of the unit of FIG. 1 in closed condition. Many of the features previously described are again illustrated in this sectional view. The fan 42 draws ambient air 3 through the air-intake port 22 of the upper housing 20 into the plenum structure defined by the plenum wall structure 68 defining the air-intake chamber 41. The air 3 in the upper housing 20 travels through the upper housing cover air inlet ports 62, on through inlet apertures 124 of the canister assembly tray into the air-treatment chamber 101 defined by the lower housing 100. Within the lower housing 100, the pressurized air 5 swirls about the canisters 140 wherein through heat exchange with the lower-temperature contents of the canisters 140 heat from the air 5 in the lower compartment is given up and thereby cooled. In the view of FIG. 7, tops 142 can be seen affixed to the canisters (canisters that are in the nature of bottles in this embodiment) 140 shown. Absorbent material 160 is disposed at the bottom of the lower housing 100 to absorb condensate that may collect on and drip from canisters 140 as air 5 is cooled in the lower housing 100.

The plenum structure 68 helps direct intake ambient air 3 that has been drawn in by the fan 42 through the upper housing cover apertures 62 and assembly tray inlet apertures 124 into the lower housing 100. The exhaust from the fan 42 feeds directly into the plenum formed by the plenum wall structure 68 (the air-intake chamber 41). The fan 42 pressurizes the air-treatment chamber 101 defined by the lower housing 100 thereby causing air to circulate around the canisters 140 wherein the circulated air is thus cooled by heat exchange with lower-temperature contents 145 of the canisters 140.

For a cooling application, each canister 140 is filled with a freezable, phase-changeable fluid such as water, a gel, or water in which a substance has been added that lowers the melting point of frozen water so as to prolong its frozen state. For example, a suitable additive that lowers the melting point of frozen water is KoolerGel which is manufactured and sold by Trophy Bag Kooler of Bethany, Okla., in the United States. The invention further teaches that the canisters 140 can be filled with a fluid then placed in a freezer device whereby the fluid is caused to freeze. In an example of use, the canister assembly 120 is placed in a vertical orientation on its tray 122 wherein the bottle tops 142 are removed and the canisters (bottles) 140 are filled with fluid (such as water, with or without additive), or a gel and then the tops are re-affixed to the canisters 140. The retention plate 130 is fitted into place over the canister caps 142. As an alternative, the retention plate 130 is manufactured with smaller apertures (not shown) for receiving the uppermost portions of canisters 140. The retention plate with smaller apertures is placed over the necks of the canisters 140 before the caps 142 are affixed. Then the caps 142 are affixed to the tops of canisters 140 thus helping to secure the retention plate 130 to the canisters 140. Assembly retainers (not shown in this view) secure the canisters 140 between the tray 122 and the retention plate 130. The assembly 120 is placed into a freezer whereby the content of the canisters 140 is frozen. The canister assembly 120 of the illustrated embodiment is placed in a freezing device such as a typical residential or commercial food freezer, or a more sophisticated freezer device. The assembly may be placed in the freezing device in either an upright condition, that is, with the tray 122 of the assembly 120 on the bottom or in a so-called inverted position with the tray 122 uppermost. Freezing in the inverted orientation promotes more uniform expansion of the walls of the tapered-top type of canister 140 as the contents 145 of the canisters 140 expand upon freezing. More uniform expansion of walls of the canisters 140 help provide a more uniform array structure for the assembly 120. The assembly is removed from the freezer, placed in an orientation with the tray 122 topmost, and inserted into the lower housing 100 of the unit 10.

In a heating application, the substance in the canisters 140 is a heated substance such as hot water, hot oil or heated wax. The type of wax referred to herein includes paraffin that is typically found in a solid phase but when heated melts and becomes liquid wherein it is then utilized as a liquid phase-changeable substance. The solid wax/paraffin can be employed in a pelletized form for loading into the canisters 140. A canister of a different configuration having a wider opening is contemplated to accommodate larger pieces of solid wax/paraffin.

The canister assembly 120 provides a modular heat-exchange core element for the compact, portable personal unit 10. Whenever the heat exchange properties of the heat exchange substance 145 need to be replenished, the assembly 120 is placed in a recharge environment such as a freezer that will re-freeze the substance 145 used for cooling or a heating unit that would re-heat the substance 145 that is used for heating. The invention further teaches that extra canister assemblies 120 can be maintained in a state of readiness for replacement of an entire canister assembly 120. For example, an entire assembly 120 of canisters 140 containing frozen substances 145 can replace an expended assembly 120 in the unit 10 that has been used for cooling. The invention also teaches that the unit 10 may be changed over from a cooling mode to a heating mode or from a heating mode to a cooling mode by changing out the canister assembly 120 that is in place in the unit 10 to an assembly 120 that contains the new desired heat-exchange substance 145.

Figure 8:
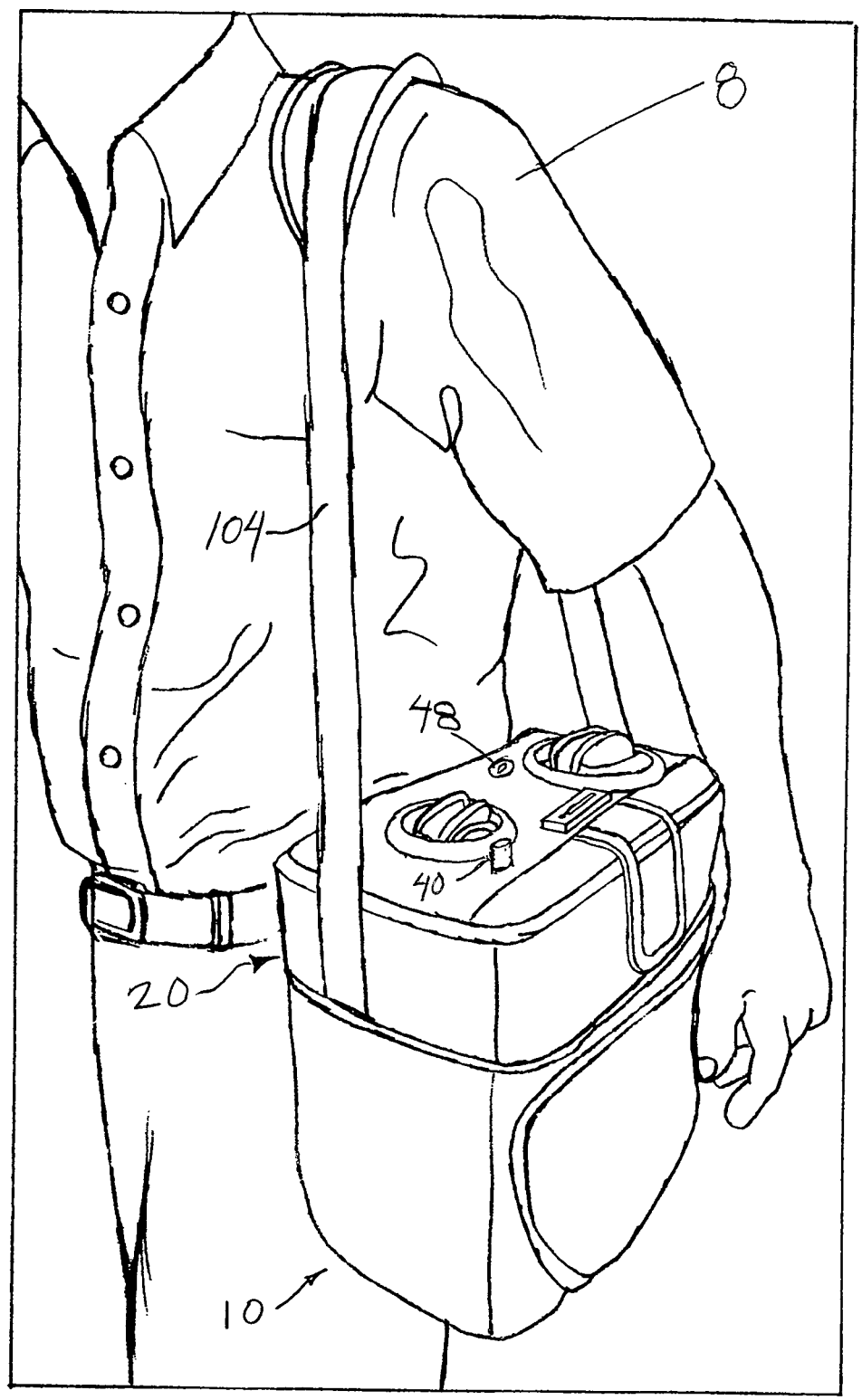
FIG. 8 is a perspective illustration of the portable personal air-treatment unit of FIG. 1 shown being carried by an individual.

Referring now to FIG. 8, therein is shown the portable personal air-treatment unit 10 as described and taught herein being carried by an individual 8 through use of the shoulder strap 104.

Many variations and modifications may be made to the above-described embodiments without departing from the scope of the claims. All such modifications, combinations, and variations are included herein by the scope of this disclosure and the following claims.

One variation taught by the invention is the separability of the upper housing 20 and lower housing 100. The separability of these two features facilitates access to the lower compartment and air-treatment chamber formed within the interior of the lower housing 100. As described herein, the canister assembly 120 is loaded into and removed from the interior of the lower housing 100. Access to the interior of the lower housing 100 also permits removal of condensate that may have accumulated. The invention has been described as having the upper housing 20 and lower housing 100 being pivotable with respect to one another as a means for providing access to the interior lower housing 100. However, the invention contemplates and teaches a unit 10 in which the upper housing 20 is fully-removable from the lower housing 100. Variations with respect to pivot mechanism include, but are not limited to, tabs serving as hinging structures and a vertically rather than horizontally oriented hinge structure.

The invention teaches that the top/upper housing 20 is secured to the lower housing by means of a fastener 15. The fastener may be any structure suitable for selectively securing two walled-type elements together for example a clasp structure or Velcro or similar brand hook-and-loop type fasteners. Similarly, a zipper-type of mechanism may be used to selectively join the two housings 20, 100. Any other suitable conventional means may be employed. For example, secure closure may be achieved by constructing the openings of the upper 20 and lower 100 housings in dissimilar sizes such that the two openings are simply secured by a close fit between the openings of the two housings 20, 100.

The upper housing 20 of the unit has been described as having an air air-intake port 22 and an exhaust-air port 32 each covered with a louvered structure. However, the invention contemplates and teaches that the ports 22, 32 can be uncovered, or covered with a one-piece covering such as a manually of automatically removable cap. In addition, the invention teaches a non-adjustable louvered arrangement rather than adjustable louvers.

For a cooling application, optimum cooling is obtained by using a fluid, freezable, phase-changeable substance such as water or gel. For example, water, a liquid type of fluid, when frozen into ice becomes a frozen phase-changeable substance. Cooling is also achieved by using substances that are not in a phase-changeable form, for example, water that is simply chilled but not frozen; however, better results can be obtained by using the frozen, phase-changeable form of heat-exchange substance. Similarly, in a heating application, heat exchange is optimized when a phase-changeable substance such as hot, melted wax in liquid phase is used.

The importance of phase changeable substance is that extra amounts of energy are derived from or transferred to substances of this nature during a phase change. For example, a phase change such as going from a frozen solid phase of a substance to a liquid or gaseous fluid phase. Such phase change occurs during cooling when heat is taken on by frozen water from air that is being cooled during the air-cooling process.

The canisters 140 are made of heat-conductable, expandable material. Plastic type material is suitable.

A canister 140 variation contemplated by the invention is that canisters 140 employed may have a shape or configuration other than the general shape of a soft drink bottle. For example, canisters 140 having a generally elongated body around which air can freely circulate are suitable. As a further variation regarding size and shape of canisters 140, when canisters 140 in an assembly 120 are used that have a smaller diameter or cross-sectional area than the diameter or cross-sectional area of a soft-drink bottle or soft-drink can, more efficient heat transfer can be achieved because more surface area for heat transfer in total is available than in an assembly of canisters 140 of larger diameter.

Variations in the canister assembly 120 and related elements are contemplated by the invention. For example, the assembly 120 may be used in a variation wherein the assembly 120 is not inverted for insertion in the lower housing 100 but is inserted in a tray-down orientation. As an additional variation, the canister assembly 120 may be positioned in the interior of the lower housing 100 by means of a suspension element other than the lip/abutment 102 shown. Any conventional mechanical type means including but not limited to members extending from the downward facing plate of the assembly that position the assembly 120 at or above the lowermost surface of the lower housing 100.

The invention encompasses and contemplates additional variations with respect to the canister assembly 120. For example, although the embodiment of the unit 10 illustrated and described herein has eight canisters 140 arranged in a two-by-four, dual-straight-line arrangement, other numbers of canisters 140 and other geometric arrangements are suitable and within the teachings of the invention. Fewer than eight canisters 140 including but not limited to a single canister may be used. As another variation, more than eight canisters 140 can be used. In another variation, rather than a straight-line type of arrangement of canisters 140, a staggered or baffle-type arrangement can be used.

The invention teaches a further variation in the types of cold and hot heat-exchange substances. The invention teaches cold and hot heat-exchange substances that self-generate heat or cold in the manner of so-called instant cold and instant heat packs. An instant cold pack, also known as an instant ice pack, contains select chemicals that are separated until the package is squeezed and the chemicals are combined to produce an endothermic reaction that takes on heat thereby producing a cold sensation. In one type of typical cold pack, a quantity of water is initially separated from a quantity of select chemical substance that when mixed with water creates an endothermic reaction. The select chemical is often ammonium nitrate, calcium ammonium nitrate, or urea. Typically, a bag of one of the reactants is placed within a larger bag containing the other reactant. The outer bag is sufficiently squeezed to cause the inner bag to rupture and thus permit mixing of the reactants. The invention contemplates a canister containing such reactants that are mixed in a predetermined manner to initiate the endothermic reaction. Heated heat-exchange material may be provided in the same manner as just described with respect to a cold heat-exchange material wherein the reactants when mixed together produce an exothermic reaction thereby producing heat.

The invention claimed is:

1. An air-treatment system comprising:
   an air-intake chamber and an air-exhaust chamber isolated and distinct from one another, and an air-treatment chamber interposed between said air-intake chamber and said air-exhaust chamber,
   said air-intake chamber comprising an air-intake port adapted for passage of ambient exterior intake air, a fan having a fan intake adjacent said air-intake port and having a fan exhaust, plenum structure having a plenum opening adjacent said fan exhaust said plenum structure terminating in least one upper-housing cover inlet aperture adapted for passage of said intake air exhausted from said fan exhaust, said air-treatment chamber comprising a lower housing having at least one lower-housing inlet aperture corresponding to and in alignment with said at least one upper-housing cover inlet aperture adapted for placing said air-treatment chamber in closed fluid-flow communication with said air-intake chamber, a removable canister assembly comprising at least one heat-conductible, fillable, sealable canister adapted for containing a heat-exchange substance, disposed to permit air flow therearound, and a lower-housing outlet aperture adapted for placing said air-treatment chamber in alignment with said exhaust-air chamber;

said air-exhaust chamber comprising an exhaust-air port adapted for placing said air-exhaust chamber in fluid-flow communication with the environment exteriorly of said air-exhaust chamber and a conduit extending from said exhaust-air port through said lower-housing outlet aperture adapted for placing said air-treatment chamber and said air-exhaust chamber in closed fluid communication with one another;

wherein said air enters said air-treatment chamber through said lower-housing intake aperture and said air exits said air-treatment chamber through said lower-housing outlet aperture; and wherein said fan urges said ambient intake air on a closed pathway into and through said plenum structure and through said at least one upper housing cover inlet aperture and said lower housing cover inlet aperture creating pressurized said air that circulates about said at least one heat-conductible, fillable, sealable canister thereby maximizing heat exchange therebetween wherein resulting pressurization urges treated said air outwardly of said air-exhaust chamber though said lower housing outlet aperture.

2. The air-treatment system of claim 1, further comprising the heat-exchange substance disposed within said at least one heat-conductible, fillable, sealable canister.

3. The air-treatment system of claim 2, wherein said heat-exchange substance comprises a phase-changeable substance in one of a solid or fluid phase that will change phase as a result of heat transfer.

4. The air-treatment system of claim 3, wherein said phase-changeable substance comprises frozen water.

5. The air-treatment system of claim 3, wherein said phase-changeable substance comprises frozen water treated with a substance that lowers a melting point of frozen water.

6. The air-treatment system of claim 3, wherein said phase-changeable substance comprises a frozen gel.

7. The air-treatment system of claim 3, wherein said phase-changeable substance comprises a wax material heated to a predetermined elevated temperature.

8. The air-treatment system of claim 2, wherein said heat-exchange substance comprises chemical reactants mixed together to produce one of an endothermic or exothermic reaction.

9. The air-treatment system of claim 1, wherein said at least one heat-conductible, fillable, sealable canister comprises a plurality of heat-conductible, fillable, sealable canisters disposed in spaced-apart arrangement so as to permit air flow between and around said canisters and wherein said fan is disposed for circulating said air between and around said canisters.

10. The air-treatment system of claim 1, further comprising an upper housing comprising said air-intake chamber and said air-exhaust chamber.

11. The air-treatment system of claim 1, wherein said upper housing is openable and closeable with respect to said lower housing.

* * * * *

UNITED STATES PATENT AND TRADEMARK OFFICE
CERTIFICATE OF CORRECTION

PATENT NO.        : 10,690,359 B2
APPLICATION NO.   : 15/801326
DATED             : June 23, 2020
INVENTOR(S)       : Bonnie Iris McDonald Floyd and Ronald J. Monroe, Sr.

Page 1 of 1

It is certified that error appears in the above-identified patent and that said Letters Patent is hereby corrected as shown below:

On the Title Page

Item (12), the inventors should be listed as: "Floyd et al."

Signed and Sealed this
Eighth Day of September, 2020

Andrei Iancu
*Director of the United States Patent and Trademark Office*